United States Patent
Bowers et al.

(10) Patent No.: US 9,621,269 B2
(45) Date of Patent: Apr. 11, 2017

(54) OPTICALLY DRIVEN ACTIVE RADIATOR

(71) Applicant: California Institute of Technology, Pasadena, CA (US)

(72) Inventors: Steven Bowers, Pasadena, CA (US); Firooz Aflatouni, Pasadena, CA (US); Behrooz Abiri, Pasadena, CA (US); Seyed Ali Hajimiri, Pasadena, CA (US)

(73) Assignee: CALIFORNIA INSTITUTE OF TECHNOLOGY, Pasadena, CA (US)

(*) Notice: Subject to any disclaimer, the term of this patent is extended or adjusted under 35 U.S.C. 154(b) by 0 days.

(21) Appl. No.: 13/952,493

(22) Filed: Jul. 26, 2013

(65) Prior Publication Data

US 2014/0161464 A1    Jun. 12, 2014

Related U.S. Application Data

(60) Provisional application No. 61/676,154, filed on Jul. 26, 2012.

(51) Int. Cl.
 *H04B 10/2575*  (2013.01)
 *H04B 10/90*   (2013.01)

(52) U.S. Cl.
 CPC ......... *H04B 10/2575* (2013.01); *H04B 10/90* (2013.01); *H04B 2210/006* (2013.01)

(58) Field of Classification Search
 CPC .......... H04B 10/2575–10/25759; H04B 10/90; H04B 2219/006
 See application file for complete search history.

(56) References Cited

U.S. PATENT DOCUMENTS

| | | | |
|---|---|---|---|
| 4,905,011 A | * | 2/1990 | Shea .................. H01Q 1/38 342/361 |
| 5,014,070 A | * | 5/1991 | Stock et al. ........... 343/700 MS |

(Continued)

FOREIGN PATENT DOCUMENTS

| | | |
|---|---|---|
| DE | 10200601003 A1 | 6/2007 |
| EP | 0791878 A2 | 8/1997 |

(Continued)

OTHER PUBLICATIONS

International Preliminary Report on Patentability for PCT Application No. PCT/US2013/026749 mailed Aug. 28, 2014, 10 pages.

(Continued)

*Primary Examiner* — David Payne
*Assistant Examiner* — Casey Kretzer
(74) *Attorney, Agent, or Firm* — Alston & Bird LLP (57) ABSTRACT

A multi-port radiator radiates electromagnetic signal in response to a beat frequency of a pair of optical signals. The radiator includes a multitude of optical paths each carrying an optical signal having first and second wavelengths. A multitude of frequency conversion elements convert the optical signals to electrical signals and deliver them to the radiator's multiple ports. The frequency of the electrical signals, and hence the frequency of the electromagnetic wave, is defined by the difference between the first and second wavelengths. The phases of the optical signals received by the frequency conversion elements are shifted with respect to one another. Optionally, the difference between the phases of the optical signals travelling through each pair of adjacent paths is 90°. The first and second wavelengths are generated by a pair of optical sources and are optionally modulated before being combined and delivered to the optical paths.

29 Claims, 8 Drawing Sheets

(56) References Cited

U.S. PATENT DOCUMENTS

| | | | |
|---|---|---|---|
| 5,164,985 A | | 11/1992 | Nysen et al. |
| 5,751,248 A | * | 5/1998 | Thaniyavarn ........ H01Q 3/2676 342/368 |
| 5,886,671 A | | 3/1999 | Riemer et al. |
| 5,999,128 A | | 12/1999 | Stephens et al. |
| 6,140,972 A | | 10/2000 | Johnston et al. |
| 6,313,792 B1 | | 11/2001 | Merlet et al. |
| 6,469,822 B1 | | 10/2002 | Zhu |
| 6,927,745 B2 | | 8/2005 | Brown et al. |
| 7,208,940 B2 | | 4/2007 | Withanawasam et al. |
| 7,372,406 B2 | | 5/2008 | Shiotsu et al. |
| 7,557,758 B2 | | 7/2009 | Rofougaran |
| 7,609,971 B1 | | 10/2009 | Zhou |
| 7,894,777 B1 | | 2/2011 | Rofougaran |
| 8,319,549 B2 | | 11/2012 | Sengupta et al. |
| 8,432,326 B2 | | 4/2013 | Rofougaran et al. |
| 2001/0003442 A1 | | 6/2001 | Smith |
| 2003/0035610 A1 | * | 2/2003 | Keys et al. ..................... 385/16 |
| 2003/0080899 A1 | * | 5/2003 | Lee et al. ....................... 342/368 |
| 2003/0184479 A1 | | 10/2003 | Collins |
| 2003/0202801 A1 | * | 10/2003 | Izadpanah ..................... 398/200 |
| 2004/0184556 A1 | | 9/2004 | Kubo et al. |
| 2005/0242993 A1 | | 11/2005 | Hein |
| 2007/0047966 A1 | * | 3/2007 | Hironishi et al. ............ 398/161 |
| 2007/0176836 A1 | | 8/2007 | Abramov et al. |
| 2008/0136720 A1 | | 6/2008 | Parsche et al. |
| 2009/0128413 A1 | | 5/2009 | Crouch et al. |
| 2009/0140724 A1 | | 6/2009 | Kentsch |
| 2009/0168818 A1 | | 7/2009 | Gollier et al. |
| 2009/0179798 A1 | * | 7/2009 | Chiaretti et al. .............. 342/372 |
| 2009/0220030 A1 | | 9/2009 | Uhl et al. |
| 2010/0019332 A1 | | 1/2010 | Taylor |
| 2010/0045565 A1 | * | 2/2010 | Izadpanah ..................... 343/904 |
| 2010/0156747 A1 | | 6/2010 | Montgomery |
| 2010/0231452 A1 | | 9/2010 | Babakhani et al. |
| 2010/0265146 A1 | | 10/2010 | Montgomery et al. |
| 2011/0057712 A1 | | 3/2011 | Bowers et al. |
| 2011/0068807 A1 | | 3/2011 | Kesil et al. |
| 2011/0103801 A1 | | 5/2011 | Breunig et al. |
| 2011/0115677 A1 | | 5/2011 | Rao et al. |
| 2011/0170869 A1 | | 7/2011 | Mandai et al. |
| 2013/0278473 A1 | | 10/2013 | Bowers et al. |
| 2013/0279631 A1 | | 10/2013 | Bowers et al. |
| 2014/0062805 A1 | | 3/2014 | Bowers et al. |

FOREIGN PATENT DOCUMENTS

| | | |
|---|---|---|
| KR | 10-2001-0096244 A | 11/2001 |
| RU | 2414051 C1 | 3/2011 |
| WO | 2010/015365 A2 | 2/2010 |
| WO | 2012/094051 A2 | 7/2012 |
| WO | 2013/112214 A2 | 8/2013 |
| WO | 2013/123090 A1 | 8/2013 |
| WO | 2013/123520 A1 | 8/2013 |
| WO | 2013/172896 A2 | 11/2013 |
| WO | 2014/018927 A1 | 1/2014 |

OTHER PUBLICATIONS

Babakhani et al., "Transmitter Architectures based on Near-Field Direct Antenna Modulation," IEEE Journal of Solid-State Circuits, vol. 43, No. 12, Dec. 2008, pp. 2674-2692.

Laskin et al., "170-GHz Transceiver with On-Chip Antennas in SiGe Technology," IEEE Radio Frequency Integrated Circuits Symposium Digest, Jun. 2008, pp. 637-640.

Park et al., "A 0.38THz Fully Integrated Transceiver utilizing Quadrature Push-Push Circuitry," Symposium on VLSI Circuits Digest of Technical Papers, Jun. 2011, pp. 22-23.

Sengupta et al., "A 0.28THz 4x4 Power-Generation and Beam-Steering Array," International Solid State Circuits Conference Digest, Feb. 2012, pp. 9-11.

Sengupta et al., "Distributed Active Radiation for THz Signal Generation," International Solid State Circuits Conference Digest, Feb. 2011, pp. 288-289.

Sengupta et al., "Sub-THz Beam-Forming using Near-Field Coupling of Distributed Active Radiator Arrays," Radio Frequency Integrated Circuits Symposium, Jun. 2011, 4 pages.

Tang et al., "A 144GHz 0.76cm-Resolution Sub-Carrier SAR Phase Radar for 3D Imaging in 65nm CMOS," International Solid State Circuits Conference Digest, Feb. 2012, pp. 264-266.

International Search Report for International Application No. PCT/US2012/060698 mailed on Jul. 18, 2013, 2 pages.

U.S. Appl. No. 13/654,420, filed Oct. 18, 2012 by Bowers et al. (unpublished, copy available via the U.S. Patent and Trademark Office's IFW system).

International Search Report and Written Opinion for International Application No. PCT/US2013/025989 mailed on Jun. 3, 2013, 12 pages.

International Preliminary Report on Patentability for International Application No. PCT/US2012/060698 issued on Apr. 22, 2014, 6 pages.

International Search Report and Written Opinion for International Application No. PCT/US2013/052396 mailed on Nov. 21, 2013, 12 pages.

International Search Report and Written Opinion for International Application No. PCT/US2013/026749 mailed on Dec. 10, 2013, 11 pages.

Non-Final Office Action for U.S. Appl. No. 13/654,420 mailed Jan. 21, 2015, 22 pages.

International Preliminary Report on Patentability for International Application No. PCT/US2013/052396 mailed Feb. 5, 2015, 9 pages.

Non-Final Office Action for U.S. Appl. No. 13/770,935 mailed Apr. 8, 2015, 8 pages.

Non-Final Office Action for U.S. Appl. No. 13/766,667 mailed Apr. 16, 2015, 7 pages.

PCT Written Opinion of the International Searching Authority for application PCT/US2012060698 mailed Jul. 18, 2013.

U.S. Appl. No. 13/654,420, Notice of Allowance mailed Aug. 19, 2015.

U.S. Appl. No. 13/654,420, Response to Non-Final Office Action mailed Jul. 21, 2015.

* cited by examiner

OPTICALLY DRIVEN ACTIVE RADIATOR

CROSS-REFERENCES TO RELATED APPLICATIONS

The present application claims the benefit of U.S. provisional application No. 61/676,154, filed Jul. 26, 2012, entitled "OPTICALLY DRIVEN ACTIVE RADIATOR", the contents of which is incorporated herein by reference in its entirety. The present application is also related to U.S. application Ser. No. 13/654,420, filed Oct. 18, 2012, entitled "EFFICIENT ACTIVE MULTI-DRIVE RADIATOR", and U.S. application Ser. No. 13/770,935, filed Feb. 19, 2013, entitled "DYNAMIC POLARIZATION MODULATION AND CONTROL", the contents of which are also incorporated herein by reference in their entirety.

STATEMENT AS TO RIGHTS TO INVENTIONS MADE UNDER FEDERALLY SPONSORED RESEARCH AND DEVELOPMENT

The present invention was made with government support under FA8650-09-C-7924 awarded by USAF/ESC. The government has certain rights in the invention.

FIELD OF THE INVENTION

The present invention relates generally to a radiator radiating electro-magentic waves, and more particularly to an integrated optically driven radiator.

BACKGROUND OF THE INVENTION

The demand for wireless communication continues to rise. As the lower end of the frequency spectrum becomes more crowded, the need to utilize additional spectrum at higher millimeter-wave frequencies has come to the fore. Advances in semiconductor manufacturing processes and in scaling down the minimum transistor/feature dimensions have made it possible to integrate an entire transmitter system on a chip. However, to use the CMOS technology at such high frequencies, many technical challenges need to be overcome. Furthermore, because an efficient antenna should have a dimension that is at least about half the wavelength of the signal it is designed to radiate, conventional antennas are often fabricated off chip and connected to the rest of the transmitter through a printed circuit board (PCB) or a metal trace. Accordingly, most such antennas have a single output to an amplifier disposed in the transmitter system. Radiation, on-chip power generation, impedance matching, and transfer of power off-chip also pose challenges. For example, traditional power transfer techniques, such as bonding wires, solder balls or solder bumps to off-chip loads (e.g., external antennas) also become increasingly ineffective at high frequencies. A need continues to exist for improved systems and methods that efficiently and effectively radiate electromagnetic signals.

BRIEF SUMMARY OF THE INVENTION

BRIEF DESCRIPTION OF THE DRAWINGS

A radiator, in accordance with one embodiment of the present invention, includes, in part, N optical paths each delivering to the radiator an associated optical signal having first and second wavelengths. In response, the radiator radiates an electromagnetic signal whose frequency is defined by the difference between the first and second wavelengths. N is an integer greater than one. In one embodiment, the radiator further includes, in part, M frequency conversion elements each adapted to convert an associated optical signal to an electrical signal and deliver the electrical signal to an associated one of N ports of the antenna disposed in the radiator. M is an integer greater than or equal to N.

In one embodiment, the difference between the phases of the optical signals received by the $i^{th}$ and $(i+1)^{the}$ frequency conversion elements is substantially similar to the difference between the phases of the optical signals received by $(i+1)^{th}$ and $(i+2)^{the}$ frequency conversion elements, where i is an index ranging from 1 to N. In one embodiment, the N phases of the N optical signals are distributed over a $2k\pi$ phase, where k is an integer greater than or equal to 1. In one embodiment, the difference between phases of the optical signals received by $i^{th}$ and $(i+1)^{th}$ frequency conversion elements is defined by the difference between lengths of the $i^{th}$ and $(i+1)^{th}$ optical paths.

In one embodiment, the radiator further includes, in part, at least one phase modulator adapted to vary the relative phases of the optical signals travelling through at least two of the N optical paths. In one embodiment, such a phase modulator is adapted to vary the index of refraction of the medium associated with one of the optical paths relative to the other. In one embodiment, the index of refraction of the medium is changed by varying the biasing signal it receives. In one embodiment, the first and second wavelengths are generated by first and second sources of optical signals from which the N optical paths receive their signals.

In one embodiment, the radiator further includes, in part, first and second optical phase modulators. The first phase modulator modulates the phase of the optical signal it receives from a first optical source to generate a first phase-modulated signal having the first wavelength. The second optical phase modulator modulates the phase of the optical signal it receives from a second optical source to generate a second phase-modulated signal having the second wavelength. In one embodiment, the radiator further includes, in part, an optical signal combiner operative to combine the signals it receives from the first and second sources of optical signals. In one embodiment, the optical signal combiner is a Y-junction.

In one embodiment, a subset of the M frequency conversion elements include non-linear optical elements. In one embodiment, the first and second sources of optical signals are lasers. In one embodiment, the antenna is a ring antenna. In one embodiment, the radiator further includes, in part, a ground ring positioned away from and enclosing the antenna ring. In one embodiment, the radial distance between the antenna ring and the ground ring is defined substantially by one-quarter of the wavelength of the radiated signal. In one embodiment, the radiator is formed in a semiconductor substrate. In one embodiment, the radiated signal has a frequency in the range of 100 MHz to 10 THz. In one embodiment, at least one of the non-linear optical elements is a photodiode.

A method of radiating an electromagnetic signal, in accordance with one embodiment of the present invention includes, in part, delivering N optical signals via N optical paths to a radiator, each optical signal including first and second wavelengths, and causing the radiator to radiate the electromagnetic wave having a frequency defined by the difference between the first and second wavelengths. N is an integer greater than one. In one embodiment, the method further includes, in part, converting the N optical signals to N electrical signals using M frequency conversion elements, and delivering the N electrical signals to N ports of an antenna disposed in the radiator.

In one embodiment, the difference between the phases of the optical signals received by the $i^{th}$ and $(i+1)^{the}$ frequency conversion elements is substantially similar to the difference between the phases of the optical signals received by $(i+1)^{th}$ and $(i+2)^{the}$ frequency conversion elements, where i is an index ranging from 1 to N. In one embodiment, the N phases of the N optical signals are distributed over a $2k\pi$ phase, where k is an integer greater than or equal to 1. In one embodiment, the difference between phases of the optical signals received by $i^{th}$ and $(i+1)^{th}$ frequency conversion elements is defined by the difference between lengths of the $i^{th}$ and $(i+1)^{th}$ optical paths.

In one embodiment, the method further includes, in part, at least one phase modulator adapted to vary the relative phases of the optical signals travelling through at least two of the N optical paths. In one embodiment, such a phase modulator is adapted to vary the index of refraction of the medium associated with one of the optical paths relative to the other. In one embodiment, the index of refraction of the medium is changed by varying the biasing signal it receives. In one embodiment, the first and second wavelengths are generated by first and second sources of optical signals from which the N optical paths receive their signals.

In one embodiment, the method further includes, in part, controlling the difference between phases of the optical signals received by the $i^{th}$ and $(i+1)^{th}$ frequency conversion elements by varying the index of refraction of the medium in which the $i^{th}$ optical path is formed. In one embodiment, the method further includes, in part, changing the bias applied to the medium to vary its index of refraction.

In one embodiment, the method further includes, in part, generating the first and second wavelengths respectively from first and second sources of optical signals, and supplying the N optical signals from the first and second wavelengths generated by the first and second optical sources. In one embodiment, the method further includes, in part, modulating the phase of the optical signal received from a first optical source to generate a first phase-modulated signal having the first wavelength, and modulating the phase of the optical signal received from a second optical source to generate a second phase-modulated signal having the second wavelength.

In one embodiment, the method further includes, in part, combining the signals of the first and second sources of optical signals, and delivering the combined signals to the N optical paths. In one embodiment, the first and second optical sources are combined via a Y-junction. In one embodiment, at least a subset of the M frequency elements include non-linear optical elements. In one embodiment, the first and second sources of optical signals are lasers. In one embodiment, the antenna is a ring antenna. In one embodiment, the ground ring is positioned around to enclose the antenna ring. In one embodiment, the radial distance between the antenna ring and the ground ring is defined substantially by one-quarter of the wavelength of the signal to be radiated. In one embodiment, the radiator is formed in a semiconductor substrate. In one embodiment, the radiated signal has a frequency in the range of 100 MHz to 10 THz. In one embodiment, at least one of the non-linear optical elements is a photodiode.

A radiator, in accordance with one embodiment of the present invention includes, in part, a multi-port antenna operative to radiate an electromagnetic signal in response to a beat frequency of a pair of optical signals generated by a pair of optical sources.

A method of radiating an electromagnetic wave, in accordance with one embodiment of the present invention includes, in part, generating a beat frequency of a pair of optical signals, and generating an electromagnetic signal in response to the beat frequency.

DETAILED DESCRIPTION OF THE INVENTION

Figure 1:
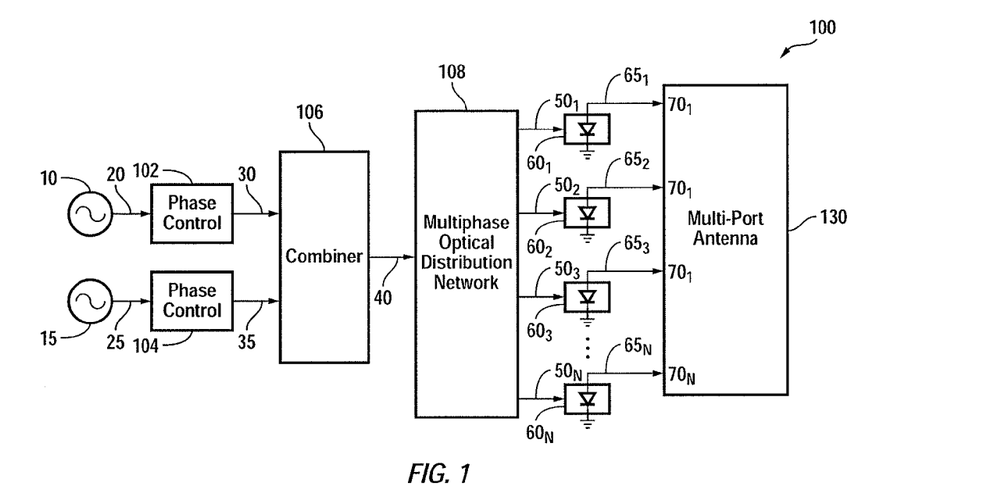
FIG. 1 is a block diagram of a multi-port radiator, in accordance with one exemplary embodiment of the present invention.

FIG. 1 is a block diagram of a multi-port radiator 100, in accordance with one exemplary embodiment of the present invention. Multi-port radiator (alternatively referred to herein as radiator) 100 is shown as including phase control blocks 102, 104, signal combiner 106, multi-phase optical distribution network 108, frequency conversion elements 60$_i$, where an index varying from 1 to N and N is an integer greater than 1, and antenna 130 having N input ports. Phase modulator/control block 102 is adapted to control/modulate the phase of optical signal 20 received from optical source 10, thereby to generate phase-modulated signal 30. Likewise, phase modulator/control block 104 is adapted to control/modulate the phase of optical signal 25 received from optical source 15, thereby to generate phase-modulated signal 35. Optical sources 10 and 20 may be lasers generating relatively high frequency signals (e.g., THZ Combiner 106 is adapted to combine signals 30 and 35 so as to form a combined signal 40 that includes wavelength $\lambda_1$ of the optical signal generated by optical source 10, as well as wavelength $\lambda_2$ of the optical signal generated by optical source 15. Optical distribution network 108 is shown as including N optical paths each adapted to deliver a portion of signal 40 to an associated frequency conversion element 60$_i$. The N optical signals travelling through the N optical paths are identified in FIG. 1 as 50$_1$, 50$_2$ ... 50$_N$. In response, each frequency conversion element 60$_i$ generates and applies to an associated port $70_i$ of antenna 130 an electrical signal $65_i$ having a frequency defined by a difference between the wavelengths $\lambda_1$ and $\lambda_2$ of optical signal 20, 25. Accordingly, each of the N ports of antenna 130 is driven by the electrical signal generated by a different one of frequency conversion elements $60_i$. In one embodiment, each frequency conversion element $60_i$ is a non-linear optical component such as a photodiode operative to convert an optical signal to an electrical signal.

Figure 2:
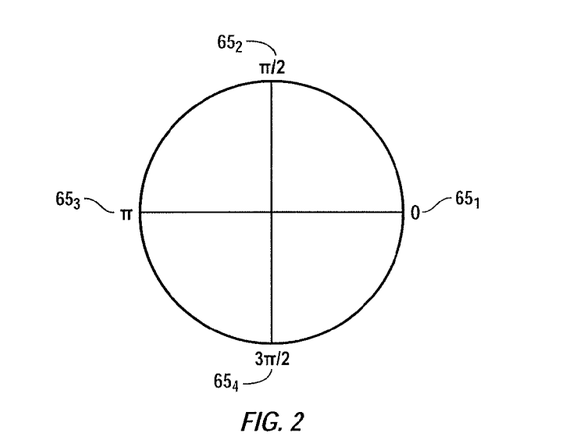
FIG. 2 shows exemplary phases of the signals delivered to the multitude of ports of the radiator of FIG. 1.
Figure 3:
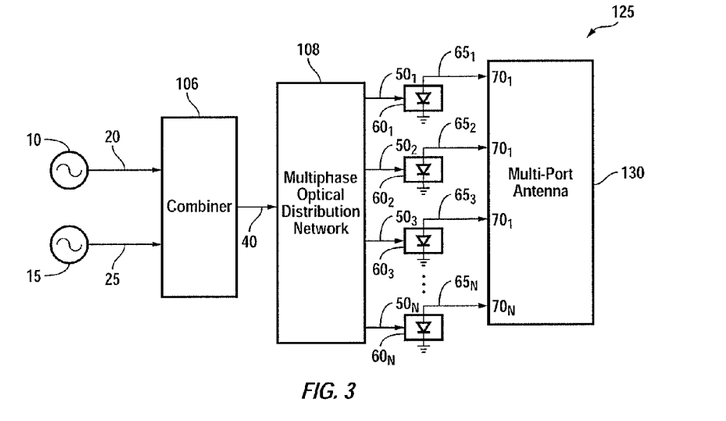
FIG. 3 is a block diagram of a multi-port radiator, in accordance with another exemplary embodiment of the present invention.

The phases of N electrical signals $65_1, 65_2 \ldots 65_{N-1}, 65_N$ generated respectively by frequency conversion elements $60_1, 60_2 \ldots 60_{N-1}, 60_N$ are distributed over a space of $2k\pi$, where k is an integer. Furthermore, in one embodiment, the $2k\pi$ phase is substantially equally divided among the phases of the N signals, such that the phase shift between signals whose indices differ by one is $2k\pi/N$. Accordingly, in one embodiment, the phase shift between signals $65_1/65_2$ is equal to $2k\pi/N$, which is the same as the phase shift between signals $65_2/65_3$, signal $65_{i-1}/65_i$, signals $65_{N-1}/65_N$, and signals $65_N/65_1$. FIG. 2 shows exemplary phases of such signals when N and k are assumed to be equal to 4 and 1, respectively. In accordance with exemplary FIG. 2, signal $65_1$ is shown as leading signal $65_2$ by 90°, signal $65_2$ is shown as leading signal $65_3$ by 90°, and signal $65_3$ is shown as leading signal $65_4$ by 90°, and signal $65_4$ is shown as lagging signal $65_1$ by 90°. In yet other embodiments, the $2k\pi$ phase is not equally divided among the phases of the N signals FIG. 3 is a block diagram of a multi-port radiator 125, in accordance with another exemplary embodiment of the present invention. Multi-port radiator 125 is similar to multi-port radiator 100 except that in multi-port radiator 125 optical signals 20, 25—generated by optical sources 10, 15—are applied to combiner 106 without being first phase modulated. Accordingly, in multi-port radiator 125, modulation of the relative phases of the optical signals $50_i$ is controlled either through the difference between the lengths of the optical paths that signals $50_i$ travel through, or via a phase modulation/control block disposed in optical distribution network 108, as is described further below.

Figure 4:
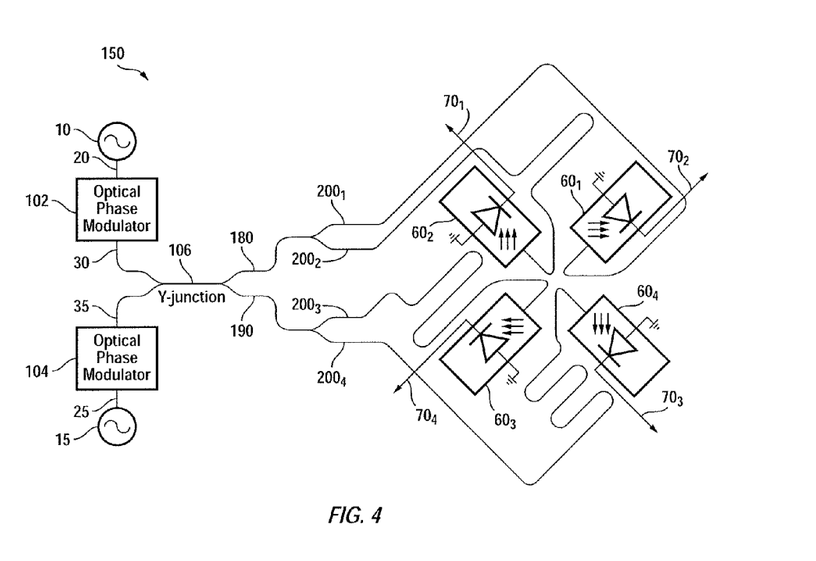
FIG. 4 is a more detailed view of a number of components of a four-port radiator, in accordance with one exemplary embodiment of the present invention.

The following description is provided with reference to a radiator having 4 input ports. It is understood however that a radiator, in accordance with embodiments of the present invention, may have any number of ports, as was described above with reference to FIGS. 1 and 3. FIG. 4 is a more detailed view of a number of components of an exemplary four-input radiator 150, in accordance with one embodiment of the present invention. Y-junction 106 is shown as receiving phase-modulated signals 30, 35 to generate and deliver to optical paths 180, 190, a signal having wavelengths of signal $\lambda_1$ as well as wavelength $\lambda_2$ of signal 35.

Optical path 180 leads into optical paths $200_1$ and $200_2$. Accordingly, a first portion of the optical signal travelling through optical path (hereinafter alternatively referred to as path) 180 is delivered to frequency conversion element $60_1$ via path $200_1$, and a second portion of the optical signal travelling through path 180 is delivered to frequency conversion element $60_2$ via path $200_2$. Likewise, optical path 190 leads into optical paths $200_3$ and $200_4$. Accordingly, a first portion of the optical signal travelling through path 190 is delivered to frequency conversion element $60_3$ via path $200_3$, and a second portion of the optical signal travelling through path 190 is delivered to frequency conversion element $60_4$ via path $200_4$. Optical paths $200_1, 200_2, 200_3$ and $200_4$ collectively form an optical distribution network, as is also shown in FIGS. 1 and 3. Although radiator 150 is shown as including four optical paths $200_1, 200_2, 200_3$ and $200_4$, it is understood that a radiator, in accordance with embodiments of the present invention, may have N paths, where N is an integer greater than one. Furthermore, while the number of optical paths and frequency conversion elements are shown as being equal in FIG. 4, it is understood that in other embodiments, the number N of optical paths and the number M of frequency conversion modules disposed in a radiator may not be equal. It is thus understood that M may be greater than or equal to N.

The lengths of paths $200_1, 200_2, 200_3$ and $200_4$ are selected so as to provide the required phase/delay shifts for the signals delivered to frequency conversion elements $60_1, 60_2, 60_3,$ and $60_4$. Consequently, in accordance with one aspect of the present invention, the relative phases of the optical signals incident on frequency conversion elements $60_1, 60_2, 60_3, 60_4$ are controlled via optical phase modulators 102, 104, as well as via the differential distances associated with optical paths $200_1, 200_2, 200_3, 200_4$.

Each frequency conversion element $60_i$ receives an optical signal travelling through an associated optical path $200_1$, and, in response, generates an electrical signal $70_i$, whose frequency is defined by the difference between the wavelengths of optical signals 20 and 25. For example, if optical source 10 is a laser having a wavelength of $\lambda_1$ and optical source 20 is a laser having a wavelength of $\lambda_2$, the frequency f of the signal generated by each frequency conversion elements $60_i$ is defined by:

$$f=c(\lambda_1-\lambda_2)/\lambda_1\lambda_2$$

where c is the speed of light. For example, when the wavelengths of the two lasers are selected to be separated in frequency by 100 MHz to 10 THz, the frequency of the signal generated by each frequency conversion element $60_i$, and hence the frequency of the signal radiated by the radiator 100 may be in the radio frequency (RF), mm-wave or THz range. In one embodiment, the frequency of the electromagnetic signal radiated by a radiator (i.e., the radiation frequency), in accordance with any of the embodiments of the present invention, may be between 100 MHz to 10 THz. As is further seen from FIG. 4, the electrical signals generated by frequency conversion elements $60_1, 60_2, 60_3, 60_4$ in response to the received optical signals, are applied respectively to input ports $70_1, 70_2, 70_3, 70_4$ of the radiator, thereby causing the radiator to radiate an electromagnetic signal, as described above.

Figure 5:
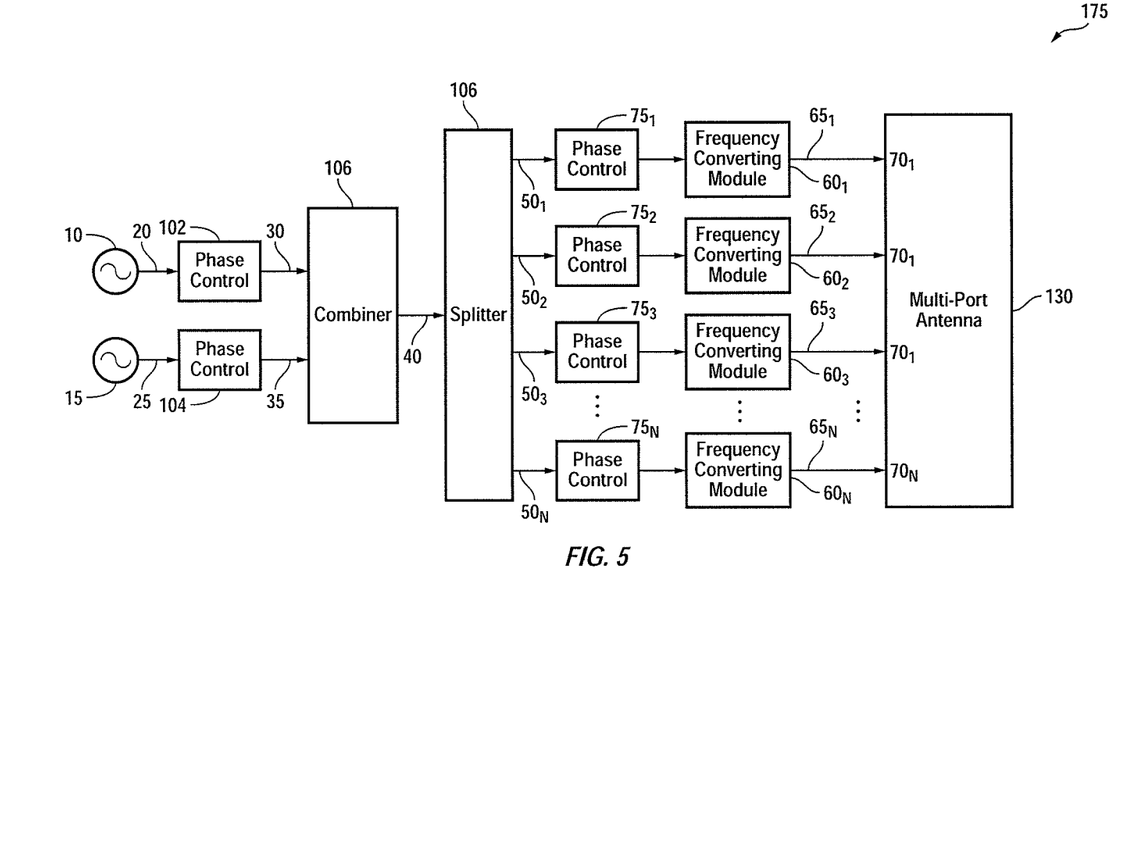
FIG. 5 is a block diagram of a multi-port radiator, in accordance with another exemplary embodiment of the present invention.

FIG. 5 is a block diagram of a multi-port radiator 175, in accordance with another exemplary embodiment of the present invention. Radiator 175 is shown as receiving optical signals 20 and 25 from optical sources 10 and 15, respectively. Phase modulator/control block 102 is adapted to control/modulate the phase of optical signal 20, thereby to generate phase-modulated signal 30. Likewise, phase modulator/control block 104 is adapted to control/modulate the phase of optical signal 25, thereby to generate phase-modulated signal 35.

Combiner 106 is adapted to combine signals 30 and 35 so as to form a combined signal 40 that includes wavelength $\lambda_1$ of optical source 10, as well as wavelength $\lambda_2$ of optical source 15. Splitter 106 operates to split signal 40 and deliver the splitted signals to N optical paths (not shown in FIG. 5) leading to N frequency conversion modules $60_1, 60_2 \ldots 60_N$. Each frequency conversion module $60_i$, where i is an index varying from 1 to N, may include one or more frequency conversion elements, such as a photodiode. The phase of each of the N optical signals $50_i$ may be controlled using an associated phase modulator/control block $75_i$ before being applied to an associated frequency conversion module $60_i$.

In response, each frequency conversion element $60_i$ generates and applies to port $70_i$ of antenna 130 an electrical signal $65_i$ having a frequency defined by a difference between the wavelengths $\lambda_1$ and $\lambda_2$ of optical signals 20, 25.

Each phase modulator/control block $75_i$ may use any one of a number of different techniques to control or vary the phase of signals $50_i$ it receives. For example, in one embodiment, each phase modulator/control blocks $75_i$ may vary the phase of its associated optical signal by changing the index of refraction of the medium in which the associated optical path is formed. The change in index may be achieved by varying its applied bias. In another embodiment, the phases may be varied by adjusting the temperature or the lengths of the associated optical paths. In yet other embodiments, cavities may be used to vary the relative phase of the optical signals.

The phases of N electrical signals $65_1$, $65_2$ ... $65_{N-1}$, $65_N$ generated respectively by frequency conversion elements $60_1$, $60_2$ ... $60_{N-1}$, $60_N$ are distributed over a $2k\pi$ phase, where k is an integer. In one embodiment, the $2k\pi$ phase is substantially equally divided among the phases of the N signals, such that the phase shift between signals whose indices differ by one is $2k\pi/N$. Accordingly, in such embodiments, the phase shift between signals $65_1/65_2$ is equal to $2k\pi/N$, which is the same as the phase shift between signals $65_2/65_3$, signal $65_{i-1}/65_i$, signals $65_{N-1}/65_N$, and signals $65_N/65_1$. In yet another embodiment, the $2k\pi$ phase is not divided substantially equally among the phases of the signals received by the input ports of the antenna.

Figure 6:
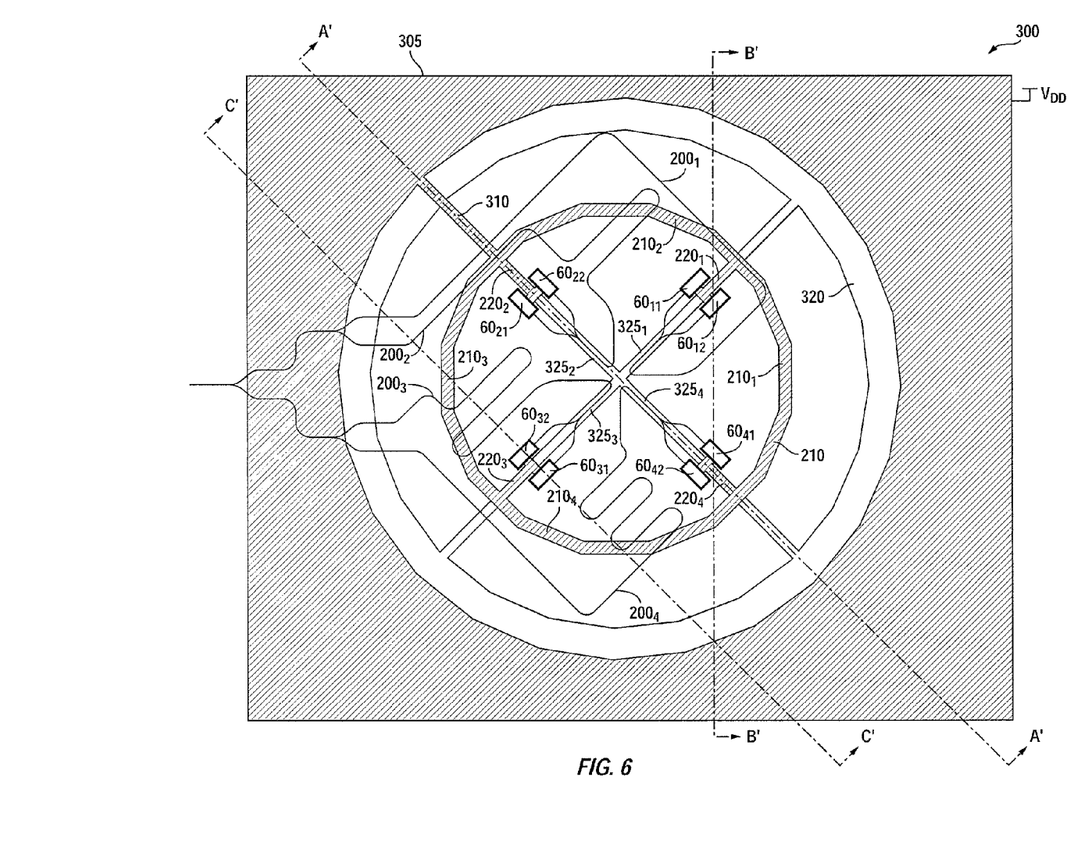
FIG. 6 is a top schematic view of a four-port radiator, in accordance with another exemplary embodiment of the present invention.

FIG. 6 is a top schematic view of a four-port radiator 300, in accordance with another exemplary embodiment of the present invention. Radiator 300 is shown as including, in part, a ring antenna 210 that, in turn, includes four continuous segments $210_1$, $210_2$, $210_3$, $210_4$ each receiving an electrical signal via an associated input port, namely input pots $220_1$, $220_2$, $220_3$, $220_4$ respectively. Each input port is shown as being associated with a pair of frequency conversion elements each of which is adapted to convert a received optical signal to an electrical signal. Frequency conversion elements $60_{11}$ and $60_{12}$ convert the optical signal received via path $200_1$ to a pair of electrical signals delivered to associated input port $220_1$; frequency conversion elements $60_{21}$ and $60_{22}$ convert the optical signal received via path $200_2$ to a pair of electrical signals delivered to associated input port $220_2$; frequency conversion elements $60_{31}$ and $60_{32}$ convert the optical signal received via path $200_3$ to a pair of electrical signals delivered to associated input port $220_3$; and frequency conversion elements $60_{41}$ and $60_{42}$ convert the optical signal received via path $200_4$ to a pair of electrical signals delivered to associated input port $220_4$.

As is described above with reference to FIG. 4, in one embodiment, the lengths of paths $200_1$, $200_2$, $200_3$ and $200_4$ may be selected so as to provide the required phase/delay shifts for the signals delivered to and generated by the photodiodes. In yet other embodiments, the relative phase/delay shifts of the optical signals may be varied by changing the index of refraction of the medium in which the optical path is formed. Consequently, for example, the electrical signal delivered by frequency conversion elements $60_{21}$, $60_{22}$ to input port $220_2$ has a 90° phase shift relative to the signal delivered by frequency conversion elements $60_{11}$, $60_{12}$ to input port $220_1$. The electrical signal delivered by frequency conversion elements $60_{31}$, $60_{32}$ to input port $220_3$ has (i) a 90° phase shift relative to the signal delivered by frequency conversion elements $60_{21}$, $60_{22}$ to input port $220_2$, and (ii) 180° phase shift relative to the signal delivered by frequency conversion elements $60_{11}$, $60_{12}$ to input port $220_1$. The electrical signal delivered by frequency conversion elements $60_{41}$, $60_{42}$ to input port $220_4$ had (i) 90° phase shift relative to the signal delivered by frequency conversion elements $60_{31}$, $60_{32}$ to input port $220_3$, (ii) a 180° phase shift relative to the signal delivered by frequency conversion elements $60_{21}$, $60_{22}$ to input port $220_1$, and (ii) a 270° phase shift relative to the signal delivered by frequency conversion elements $60_{11}$, $60_{12}$ to input port $220_1$. In one embodiment, the $2k\pi$ space is divided substantially equally among the phases of the signals received by the input ports of the antenna. In yet another embodiment, the $2k\pi$ phase space is not divided substantially equally among the phases of the signals received by the input ports of the antenna.

Accordingly, by selecting the phases of the signals delivered to the antenna ring as described above, and further, by selecting the antenna ring 210 to have a circumference defined by a wavelength of the signal to be radiated (e.g. such as one or any other integer multiple of the wavelength of the signal to be radiated), the current signals delivered to the antenna ring create a traveling current wave, which in turn, result in the radiation of electromagnetic signal along the Poynting vector and out-of-the-plane of the radiator. Optical paths $200_1$, $200_2$, $200_3$ and $200_4$ of FIGS. 6 and 4 are similar except that in FIG. 6 each optical path is shown as being split at its end to form two separate paths each delivering a portion of the optical signal to one of the associated pair of frequency conversion elements. The generation of the optical signals traveling through various paths is described above with reference to FIGS. 1, 3 and 4-5.

Referring to FIG. 6, the positive terminal of each of the frequency conversion elements, e.g., photodiode, receives the supply voltage $V_{dd}$ (applied to metal plate 305) via $V_{dd}$ feed line 310 which, in turn, is coupled to the antenna ring and thereby to the antenna's input ports. For example, as shown, frequency conversion elements $60_{21}$, $60_{22}$ receive supply voltage $Y_{dd}$ via input port $220_2$ which is coupled to metal plate 305 via $V_{dd}$ feed line 310. Likewise, frequency conversion elements $60_{11}$, $60_{12}$ receive supply voltage $V_{dd}$ via input port $220_1$ which is coupled to metal plate 305 via antenna 210 and $V_{dd}$ feed line 310. The negative terminal of each of the frequency conversion elements is coupled to the ground ring 320 via the frequency conversion element's associated ground feed. For example, as shown, frequency conversion elements $60_{11}$, $60_{12}$ receive the ground potential from ground ring 320 via ground feed $325_i$. Likewise, frequency conversion elements $60_{21}$, $60_{22}$ receive the ground potential from ground ring 320 via ground feed $325_2$.

In one embodiment, the radiator, which is used for wireless transmission, is formed in a semiconductor substrate. In such embodiments, the optical paths, frequency conversion elements, any control circuitry and/or amplifiers (not shown), are formed in the semiconductor substrate. The ground feeds $325_1$, $325_2$, $325_3$, $325_1$ and the ground ring 320 are coupled to one another and are parts of a first metal layer formed during a first metallization step. Antenna ring 210, input ports $220_1$, $220_2$, $220_3$, $220_4$, $V_{dd}$ feed line 310 and metal plate 305, which are coupled to one another, are parts of a second metal layer formed during a second metallization step. In one embodiment, the radial distance between antenna ring 210 and ground ring 320 is one-fourth of the wavelength of the signal being transmitted by the antenna. Accordingly, at the frequency of radiation, $V_{dd}$ feed line 310 provides high impedance between the antenna ring and the ground ring. Furthermore, since the currents flowing to the ground feeds and ground ring are at least nearly 90° out-of-phase relative to the currents flowing to antenna ring 210, destructive interference of electromagnetic signals in the far field is minimized and the gain of the radiator is significantly enhanced.

Figure 7:
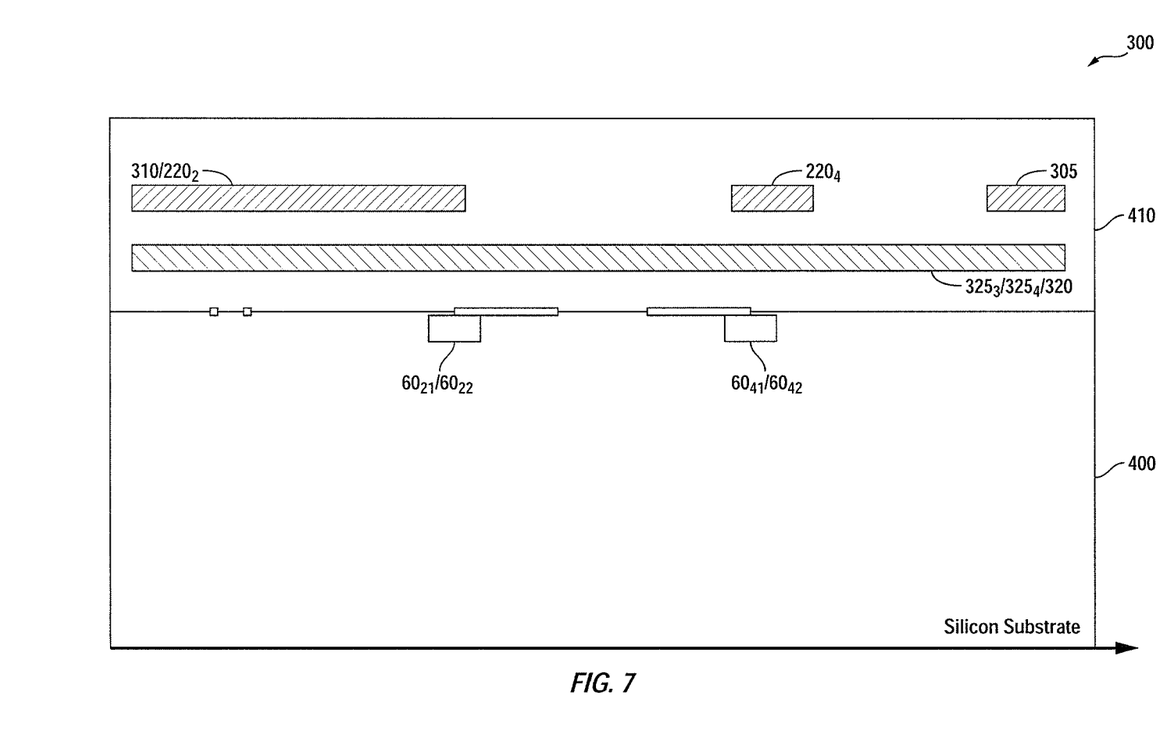
FIG. 7 is a cross-sectional view of the radiator of FIG. 6 as viewed along the lines AA'.

FIG. 7 is a cross-sectional view of radiator 300 as seen along lines AA'. As shown, frequency conversion elements $60_{21}/60_{22}$, and $60_{41}/60_{12}$ are formed in semiconductor substrate 400, which may be a silicon substrate. The first metal layer forming ground feeds $325_2$, $325_4$ and guard ring 320 is shown as having been formed above substrate 400 and insulating layer 410. Likewise, the second metal layer forming $V_{dd}$ feed line 310, input terminals $220_2$, $220_4$ and plate 305 are shown as being formed above the first metal layer. Insulating layer 410 is disposed between the first and second metal layers as well as above the second metal layer. Insulating layer 410 may be silicon dioxide.

Figure 8:
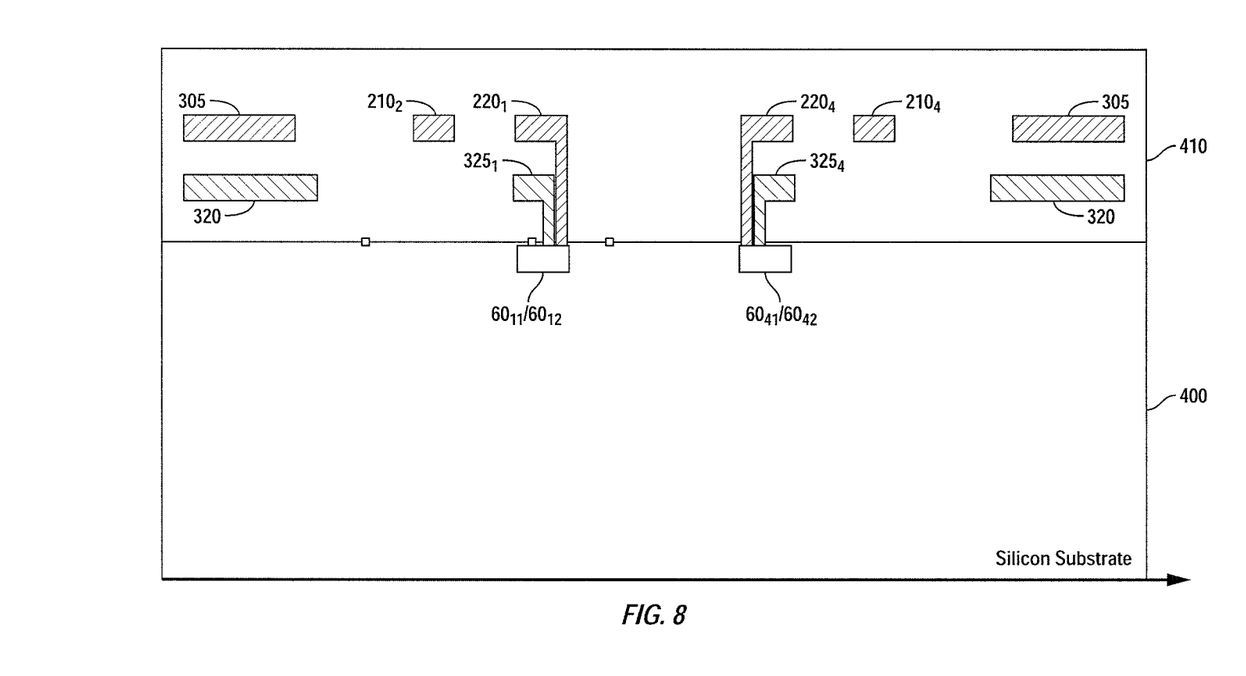
FIG. 8 is a cross-sectional view of the radiator of FIG. 6 as viewed along the lines BB'.

FIG. 8 is a cross-sectional view of radiator 300 as seen along lines BB'. Frequency conversion elements $60_{11}/60_{12}$ are shown as receiving $V_{dd}$ and the ground potential via first and second metal lines $220_1$ and $325_1$, respectively. Likewise, frequency conversion elements $60_{41}/60_{42}$ are shown as receiving $V_{dd}$ and the ground potential via first and second metal lines $220_4$ and $325_4$, respectively. Metal plate 305—supplying the $V_{dd}$ voltage—and antenna segments $210_2$ and $210_4$, which are also formed during the second metallization layer, are also shown. Also shown in this cross-sectional view are ground ring 305.

Figure 9:
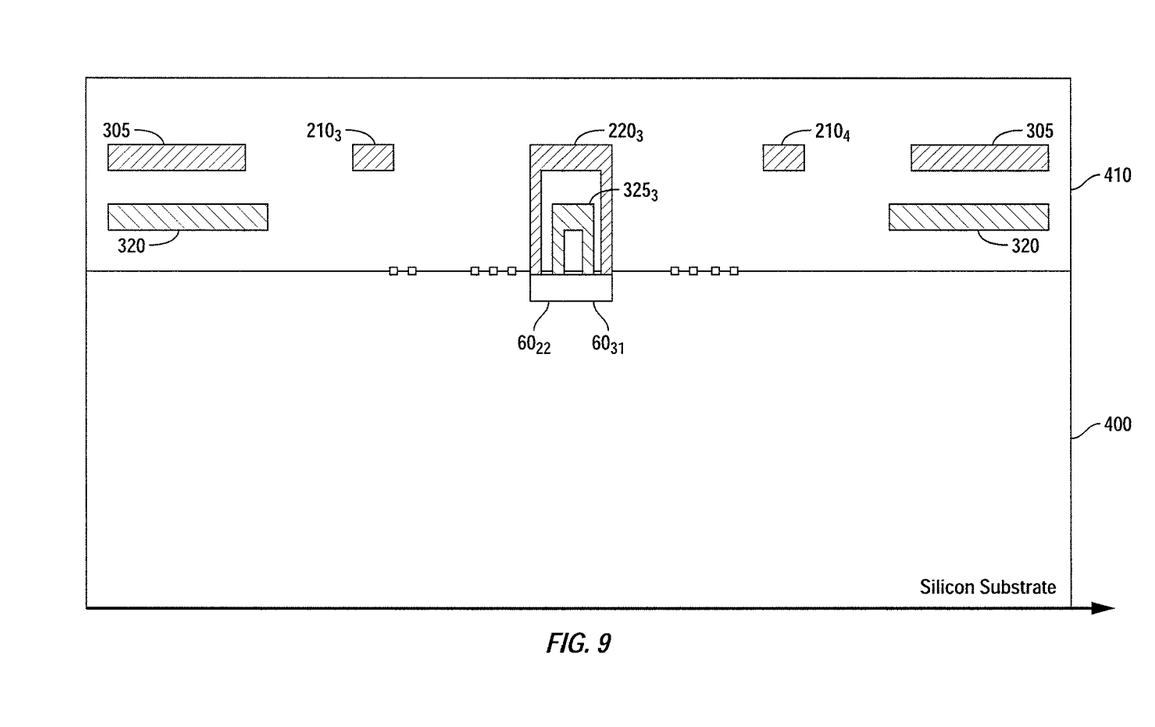
FIG. 9 is a cross-sectional view of the radiator of FIG. 6 as viewed along the lines CC'.

FIG. 9 is a cross-sectional view of radiator 300 as seen along lines CC'. Frequency conversion elements $60_{31}/60_{32}$ are shown as receiving $V_{dd}$ and ground potentials via first and second metal lines $220_3$ and $325_3$, respectively. Metal plate 305 and segments $210_3$ and $210_4$ of the antenna are also shown. Also shown in this cross-sectional view are ground ring 305.

Figure 10:
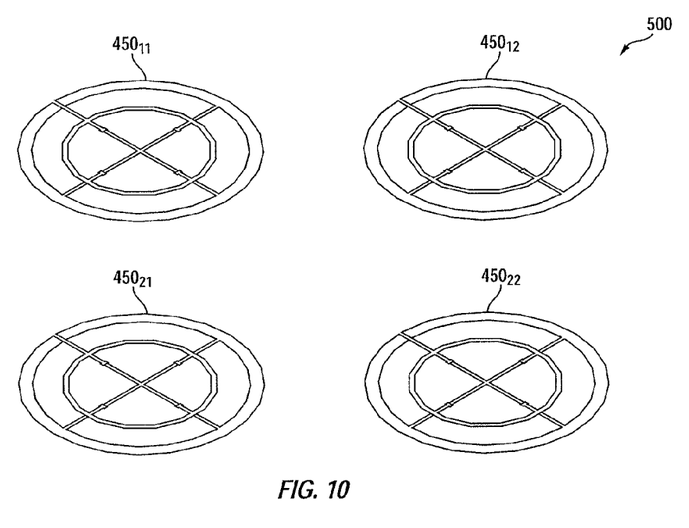
FIG. 10 is an array of optically driven radiators, in accordance with one exemplary embodiment of the preset invention.
Figure 11:
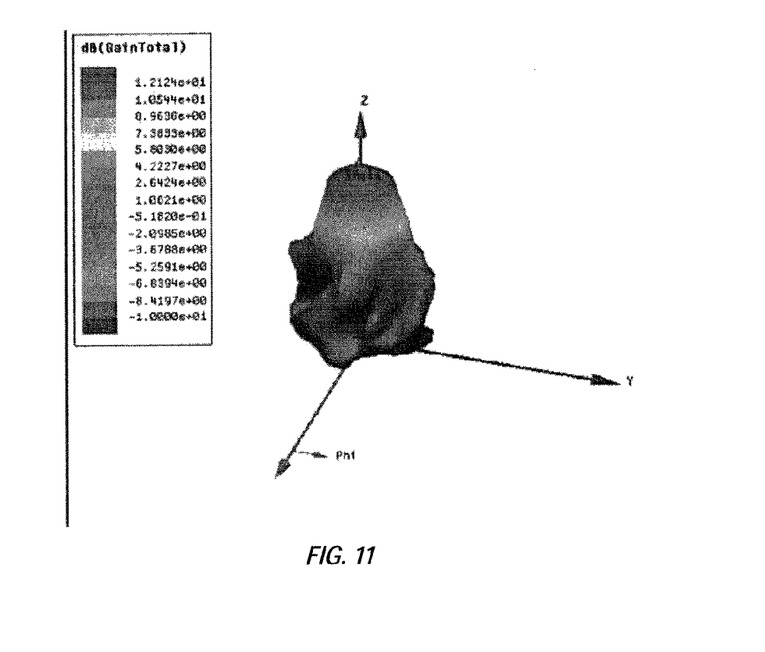
FIG. 11 is an exemplary simulation result of the radiation pattern of the radiator array of FIG. 10.

FIG. 10 shows a 2×2 array 500 of radiators, in accordance with another exemplary embodiment of the present invention. Each of the radiators $450_{11}$, $450_{12}$, $450_{21}$ and $450_{22}$, forming array 500, may be similar to the radiators shown in the Figures described above. FIG. 11 shows the simulation results of the radiation pattern of a 350 GHz signal radiated by array 500. Since, in accordance with one aspect of the present invention, the phases of the signals delivered to the radiators is controlled optically, the radiator array provides advantages in dynamic polarization modulation. For example, since optical signals have less degradation and loss, an array of radiators, in accordance with the present invention, advantageously facilitates the achievement of a 360° phase shift between clockwise and counter-clockwise circularly polarized radiators in order to modulate the polarization to all angels. It is understood that, in accordance with embodiment of the present invention, any number of radiators may be used to form an array.

The above embodiments of the present invention are illustrative and not limitative. Embodiments of the present invention are not limited by the number of input ports of the antenna. Embodiments of the present invention are not limited by the type of phase modulation, optical-to-electrical frequency conversion, or the like. Embodiments of the present invention are not limited by the type of signal combiner, splitter, waveguide, or the like used in the radiator. Embodiments of the present invention are not limited by the wavelength of the radiated signal, nor are they limited by the type of substrate, semiconductor or otherwise, in which the radiator may be formed. Other additions, subtractions or modifications are obvious in view of the present disclosure and are intended to fall within the scope of the appended claims.

What is claimed is:

1. A radiator comprising:
   an optical distribution network adapted to deliver N optical signals to N optical paths, said N optical signals having different phases distributed over a $2k\pi$ phase, each optical signal comprising first and second wavelengths;
   N frequency conversion elements each associated with and adapted to convert a different one of the optical signals to an electrical signal;
   a ring antenna comprising N ports each associated with and adapted to receive a different one of the N electrical signals and to radiate, in response, an electromagnetic signal having a frequency defined by a difference between the first and second wavelengths, wherein k is an integer equal to or greater than one and N is an integer greater than one, wherein a difference between phases of the optical signals received by ith and (i+1)th frequency conversion elements is substantially similar to a difference between phases of the optical signals received by (i+1)th and (i+2)th frequency conversion elements, wherein i is an index ranging from 1 to N−2;
   a ground ring positioned away from and enclosing the ring antenna, wherein a radial distance between the ring antenna and the ground ring is defined substantially by one-quarter of the wavelength of the radiated signal.

2. The radiator of claim 1 wherein a difference between phases of the optical signals received by and $i^{th}$ and $(i+1)^{th}$ frequency conversion elements is defined by a difference between lengths of $i^{th}$ and $(i+1)^{th}$ optical paths.

3. The radiator of claim 1 further comprising:
   at least one phase modulator adapted to vary a phase of the optical signal travelling through at least one of the N optical paths.

4. The radiator of claim 3 wherein said at least one phase modulator is adapted to vary an index of refraction of the medium in which the at least one optical path is formed.

5. The radiator of claim 4 wherein said at least one phase modulator is adapted to vary the index of refraction of the medium in which the at least one optical path is formed by varying a bias applied to the medium.

6. The radiator of claim 1 wherein the first and second wavelengths are generated by first and second sources of optical signals from which the N optical signals are received.

7. The radiator of claim 6 further comprising:
   an optical signal combiner adapted to combine the signals received from the first and second sources of optical signals.

8. The radiator of claim 7 wherein the optical signal combiner is a Y-junction.

9. The radiator of claim 6 wherein the first and second sources of optical signals are lasers.

10. The radiator of claim 1 further comprising:
    a first optical phase modulator adapted to modulate a phase of the optical signal received from a first optical source to generate a first phase-modulated signal having the first wavelength; and
    a second optical phase modulator adapted to modulate a phase of the optical signal received from a second optical source to generate a second phase-modulated signal having the second wavelength.

11. The radiator of claim 1 wherein at least a subset of the N frequency conversion elements comprises non-linear optical elements.

12. The radiator of claim 11 wherein at least one of the non-linear optical elements is a photodiode.

13. The radiator of claim 1 wherein said radiator is formed in a semiconductor substrate.

14. The radiator of claim 1 wherein the radiated electromagnetic signal has a frequency in the range of 100 MHz to 10 THz.

15. The radiator of claim 1 wherein the phases of the N optical signals are distributed equally over the 2kπ phase.

16. A method of radiating an electromagnetic signal, the method comprising:
   delivering N optical signals each comprising first and second wavelengths to a radiator via N optical paths, said N optical signals having different phases distributed over a 2kπ phase;
   converting the N optical signals to N electrical signals;
   delivering each of the N electrical signals to an associated one of N ports of a ring antenna; and
   causing the radiator antenna to radiate the electromagnetic wave having a frequency defined by a difference between the first and second wavelengths, wherein k is an integer equal to or greater than one and N is an being an integer greater than one, wherein a difference between phases of the optical signals received by ith and (i+1)th frequency conversion elements is substantially similar to a difference between phases of the optical signals received by (i+1)th and (i+2)th frequency conversion elements, wherein i is an index ranging from 1 to N−2;
   positioning a ground ring around and enclosing the ring antenna, wherein a radial distance between the ring antenna and the ground ring is defined substantially by one-quarter of the wavelength of the signal to be radiated.

17. The method of claim 16 further comprising:
   controlling a difference between phases of the optical signals received by the (i+1)th frequency conversion elements by selecting a difference between lengths of ith and (i+1)th optical paths.

18. The method of claim 16 further comprising:
   controlling a difference between phases of the optical signals received by the ith and (i+1)th frequency conversion elements by varying an index of refraction of a medium in which ith optical path is formed.

19. The method of claim 18 further comprising:
   changing the bias applied to the medium to vary the index of refraction thereof.

20. The method of claim 16 further comprising:
   generating the first and second wavelengths respectively from first and second sources of optical signals;
   supplying the N optical signals from the first and second wavelengths generated by the first and second optical sources.

21. The method of claim further 20 further comprising:
   combining the signals of the first and second sources of optical signals; and delivering the combined signals to the N optical paths.

22. The method of claim 21 further combining:
   combining the signals of the first and second optical sources via a Y-junction.

23. The method of claim 20 wherein the first and second sources of optical signals are lasers.

24. The method of claim 16 further comprising:
   modulating a phase of the optical signal received from a first optical source to generate a first phase-modulated signal having the first wavelength; and
   modulating a phase of the optical signal received from a second optical source to generate a second phase-modulated signal having the second wavelength.

25. The method of claim 16 further comprising:
   converting at least a subset of the N optical signals using non-linear optical elements.

26. The method of claim 25 wherein at least one of the non-linear optical elements is a photodiode.

27. The method of claim 16 further comprising:
   forming the radiator in a semiconductor substrate.

28. The method of claim 16 wherein the radiated electromagnetic signal has a frequency in the range of 100 MHz to 10 THz.

29. The method of claim 16 wherein the phases of the N optical signals are distributed equally over the 2kπ phase.

* * * * *